United States Patent
Mgaya et al.

(10) Patent No.: US 9,623,631 B2
(45) Date of Patent: Apr. 18, 2017

(54) RADIATION-CURABLE LAMINATING ADHESIVES

(75) Inventors: Alexander P. Mgaya, Cary, NC (US); Balasubramaniam Ramalingam, Cary, NC (US)

(73) Assignee: Henkel IP & Holding GmbH, Duesseldorf (DE)

( * ) Notice: Subject to any disclaimer, the term of this patent is extended or adjusted under 35 U.S.C. 154(b) by 819 days.

(21) Appl. No.: 11/158,366

(22) Filed: Jun. 22, 2005

(65) Prior Publication Data

US 2006/0292378 A1    Dec. 28, 2006

(51) Int. Cl.

| B32B 27/40 | (2006.01) |
|---|---|
| B32B 27/36 | (2006.01) |
| B32B 27/32 | (2006.01) |
| B32B 27/30 | (2006.01) |
| B32B 15/08 | (2006.01) |
| B32B 7/12 | (2006.01) |
| C09J 4/00 | (2006.01) |
| B32B 27/08 | (2006.01) |
| C09J 175/16 | (2006.01) |

(52) U.S. Cl.
CPC ............... B32B 7/12 (2013.01); B32B 15/08 (2013.01); B32B 27/08 (2013.01); B32B 27/304 (2013.01); B32B 27/32 (2013.01); B32B 27/36 (2013.01); C09J 4/00 (2013.01); C09J 175/16 (2013.01); *B32B 2250/02* (2013.01); *B32B 2255/10* (2013.01); *B32B 2255/26* (2013.01); *B32B 2307/714* (2013.01); *B32B 2553/00* (2013.01); *Y10T 428/3158* (2015.04); *Y10T 428/31551* (2015.04); *Y10T 428/31565* (2015.04); *Y10T 428/31587* (2015.04); *Y10T 428/31605* (2015.04)

(58) Field of Classification Search
CPC .................................. C09J 4/00; C09J 175/16
See application file for complete search history.

(56) References Cited

U.S. PATENT DOCUMENTS

| 4,618,703 A * | 10/1986 | Thanawalla et al. ......... 560/209 |
|---|---|---|
| 4,652,274 A | 3/1987 | Boettcher et al. |
| 5,128,387 A * | 7/1992 | Shustack ........................ 522/92 |
| 5,382,642 A | 1/1995 | Guo |
| 5,451,652 A | 9/1995 | Guo et al. |
| 5,475,073 A | 12/1995 | Guo |
| 5,480,954 A | 1/1996 | Guo |
| 5,534,598 A | 7/1996 | Guo |
| 5,587,433 A | 12/1996 | Boeckeler et al. |
| 5,747,551 A | 5/1998 | Lewandowski et al. |
| 5,883,148 A * | 3/1999 | Lewandowski et al. ....... 522/95 |
| 5,919,874 A | 7/1999 | Guo |
| 6,103,840 A | 8/2000 | Guo |
| 6,127,500 A | 10/2000 | Guo et al. |
| 6,153,713 A | 11/2000 | Guo |
| 6,239,189 B1 * | 5/2001 | Narayan ................. C07C 69/54 522/101 |
| 6,362,297 B1 | 3/2002 | Wang |
| 6,479,563 B1 * | 11/2002 | Liebing ..................... C09J 4/06 156/275.5 |
| 6,559,257 B2 | 5/2003 | Quarmby |
| 6,762,262 B1 | 7/2004 | Wang et al. |
| 6,809,127 B2 * | 10/2004 | Dones et al. ................. 522/176 |
| 6,906,136 B2 | 6/2005 | Pourreau |
| 6,989,407 B2 * | 1/2006 | Lapin .......................... 522/153 |
| 2003/0066600 A1 * | 4/2003 | Kauffman et al. ......... 156/274.4 |
| 2003/0161976 A1 | 8/2003 | Rea et al. |
| 2004/0084138 A1 * | 5/2004 | Henke ................. C08F 283/006 156/272.2 |
| 2004/0106693 A1 * | 6/2004 | Kauffman et al. ............ 522/184 |
| 2004/0127594 A1 | 7/2004 | Yang et al. |
| 2005/0023887 A1 | 2/2005 | Fulks et al. |
| 2005/0065310 A1 | 3/2005 | Wang et al. |
| 2005/0279029 A1 * | 12/2005 | Keipert et al. ................... 51/298 |

FOREIGN PATENT DOCUMENTS

| EP | 0443537 A | 9/1991 |
|---|---|---|
| EP | 1254936 A | 11/2002 |
| JP | 11293213 A | 10/1999 |
| WO | WO00/35671 | 6/2000 |
| WO | WO01/57094 A | 9/2001 |
| WO | WO2005/067607 A | 7/2005 |
| WO | WO2005/103178 A | 11/2005 |
| WO | 2006007036 A1 | 1/2006 |

OTHER PUBLICATIONS

Abstract: JP 06 184498A, Jul. 5, 1994, Toagosei Chem. Ind. Co. Ltd.
Abstract: JP 11 335630A, Dec. 7, 1999, Sumitomo Bakelite Co. Ltd.
European Examination Report dated Aug. 20, 2008 for Application No. 06010900.6.

* cited by examiner

*Primary Examiner* — Monique Jackson
(74) *Attorney, Agent, or Firm* — James E. Piotrowski

(57) ABSTRACT

A radiation-curable laminating adhesive is provided which contains a) at least one urethane (meth)acrylate oligomer and b) at least one additional (meth)acrylate-functionalized component selected from the group consisting of carboxylic acid-functionalized ester-containing (meth)acrylate monomers and polybutadiene poly(meth)acrylates. The adhesive may also contain other components such as (meth)acrylic polyol (meth)acrylates. Flexible packaging laminates may be obtained by using the aforedescribed adhesive to adhere thin polymeric and/or metallic films together, the adhesive being exposed to an amount of radiation effective to cure the adhesive.

20 Claims, No Drawings

RADIATION-CURABLE LAMINATING ADHESIVES

FIELD OF THE INVENTION

The present invention relates to improved adhesives that are useful for laminating thin polymeric and/or metallic films together for the purpose of forming flexible packaging laminates. The adhesives may be cured by means of radiation and contain, in addition to at least one urethane (meth) acrylate oligomer, at least one of a polybutadiene poly(meth)acrylate or a carboxylic acid-functionalized ester-containing (meth)acrylate monomer.

DISCUSSION OF THE RELATED ART

Radiation-curable adhesive compositions and radiation-cured, laminated flexible packaging materials containing such adhesives are known in the art. United States Published Application 2003/0161976, for example, describes such adhesives formulated from radiation-curable carboxylic acid functional monomers and organic titanate compounds. The radiation-curable carboxylic acid functional monomers may include half-esters formed by the reaction of a hydroxy (meth)acrylate compound with an organic anhydride. However, further improvements in such formulations would be desirable such as, for example, improved adhesion to the materials used in flexible packaging laminates to reduce the tendency of such laminates to delaminate, improved moisture resistance, improved heat seal bonds at elevated temperatures, improved bonding strength, improved chemical resistance, reduced leaching of low molecular weight components through the flexible packaging laminates prepared using the adhesive, and the like.

SUMMARY OF THE INVENTION

The present invention provides a radiation-curable laminating adhesive comprising a) at least one urethane (meth)acrylate oligomer and b) at least one additional (meth)acrylate-functionalized component selected from the group consisting of carboxylic acid-functionalized ester-containing (meth)acrylate monomers and polybutadiene poly(meth)acrylates. The invention also provides flexible packaging laminates wherein the aforedescribed adhesive is used to adhere thin polymeric films and/or metallic foils together, the adhesive being exposed to an amount of radiation effective to cure the adhesive. The urethane (meth)acrylate oligomer and poly(butadiene) poly(meth)acrylate help to improve the moisture and chemical resistance of the flexible packaging laminate and also increase the bonding strength of the laminate. In one embodiment of the invention, the adhesive additionally is comprised of at least one (meth)acrylic polyol (meth)acrylate and/or at least one reactive diluent.

DETAILED DESCRIPTION OF CERTAIN EMBODIMENTS OF THE INVENTION

The term "(meth)acrylate" is used herein to mean a functional group, moiety or substituent which may be an acrylate and/or a methacrylate.

The radiation-curable laminating adhesives of the present invention contain one or more urethane (meth)acrylate oligomers. These oligomeric materials contain at least one urethane linkage (in some embodiments, two or more urethane linkages) within the backbone of the oligomer molecule and at least one acrylate and/or methacrylate functional groups (in some embodiments, two or more acrylate and/or methacrylate functional groups) pendent to the oligomer molecule. The (meth)acrylate functional groups provide unsaturated double bonds capable of reaction when the adhesive is exposed to radiation, thereby inducing curing of the adhesive. Typically, the urethane (meth)acrylate oligomer is liquid at room temperature or at least is liquid at the temperature at which the adhesive is to be processed, although higher melting oligomers which are solubilized by the other components of the adhesive may also be used. The (meth)acrylate functional group(s) may be on the terminal position(s) of the oligomer molecule and/or distributed along the backbone of the oligomer molecule. Typically, the number average molecular weight of the urethane (meth)acrylate oligomer is from about 1000 to about 6000.

Urethane (meth)acrylate oligomers are well-known in the art and may be readily synthesized by a number of different procedures. For example, a polyfunctional alcohol may be reacted with a polyisocyanate (preferably, a stoichiometric excess of polyisocyanate) to form an NCO-terminated preoligomer, which is thereafter reacted with a hydroxy-functional (meth)acrylate. The polyfunctional alcohol may be any compound containing two or more OH groups per molecule and may be a monomeric polyol (e.g., a glycol), a polyester polyol, a polyether polyol, a (meth)acrylic polyol or the like. The urethane (meth)acrylate oligomer in one embodiment of the invention is an aliphatic urethane (meth)acrylate oligomer. In another embodiment of the invention, the urethane (meth)acrylate oligomer is a polyester urethane (meth)acrylate oligomer.

For example, a polyester polyol may be prepared by a condensation polymerization involving one or more diols and one or more diacids, anhydrides or diesters, with the stoichiometry of the reactants and the reaction conditions adjusted so as to provide terminal OH groups on the polyester thereby formed. The polyester polyol molecular weight may be, for example, from about 300 to about 10,000. Suitable diols include, for example, aliphatic glycols such as ethylene glycol, propane-1,2-diol, propane-1,3-diol, 2-methyl-1,3-propanediol, neopentyl glycol, 1,4-butanediol, 2,3-butanediol, 1,6-hexanediol, and the like. Suitable diacids and diesters include aliphatic and aromatic dicarboxylic acids and esters thereof such as, for example, succinic acid, adipic acid, suberic acid, azelaic acid, glutaric acid, glutaric anhydride, phthalic acid, isophthalic acid, terephthalic acid, phthalic anhydride, tetrahydrophthalic anhydride, maleic acid, maleic anhydride, fumaric acid, dimer fatty acids, and mixtures thereof. The hydroxyl groups of the polyester polyol may then be reacted with an aliphatic or aromatic diisocyanate, preferably in stoichiometric excess so as to provide an isocyanate-tipped preoligomer. Suitable diisocyanates include, but are not limited to, diphenylmethane diisocyanate (MDI) isomers, hydrogenated MDI isomers, xylylene diisocyanate, tetramethyl xylylene diisocyanate (TMXDI), isophorone diisocyanate (IPDI), hexane-1,6-diisocyanate (HDI), toluene diisocyanate (TDI) isomers, cyclohexane diisocyanate and the like. The isocyanate groups of the preoligomer are then reacted with a hydroxyl- and (meth)acrylate-functionalized compound to provide the urethane (meth)acrylate oligomer. The compound containing a hydroxyl group and a (meth)acrylate group may, for example, be selected from the following: 2-hydroxyethyl (meth)acrylate; 2-hydroxypropyl(meth)acrylate; 2-hydroxybutyl(meth)acrylate; 2-hydroxy 3-phenyloxypropyl(meth)acrylate; 1,4-butanediol mono(meth)acrylate; 4-hydroxycyclohexyl (meth)acrylate; 1,6-hexanediol mono(meth)

acrylate; neopentylglycol mono(meth)acrylate; trimethylolpropane di(meth)acrylate; trimethylolethane di(meth)acrylate; pentaerythritol tri(meth)acrylate; dipentaerythritol penta(meth)acrylate; and other hydroxy functional (meth)acrylates such as the hydroxy terminated (meth)acrylate monomers based on caprolactone sold under the brand name TONE by Dow Chemical (e.g. TONE M-100, M-101, and M-20).

Alternatively, a polyether polyol (with a number average molecular weight of from about 400 to about 6000, for example) could be substituted for the polyester polyol in the aforedescribed synthetic procedure. Suitable polyether polyols may be obtained by reaction of low molecular weight polyalcohols (e.g., ethylene glycol, glycerin, 1,4-butanediol, trimethylolpropane) with alkylene oxides (e.g., epoxides such as ethylene oxide, propylene oxide and/or butene oxide. Polytetramethylene glycols prepared by ring-opening polymerization of tetrahydrofuran could also be used.

In yet another embodiment, a (meth)acrylic polyol may be reacted with a polyisocyanate and then with a hydroxy functional (meth)acrylate to provide the urethane (meth) acrylate oligomer. The preparation of such oligomers is described, for example, in U.S. published application 2005-0065310, incorporated herein by reference in its entirety.

Suitable urethane(meth)acrylate oligomers are available from commercial sources, including, for example, ECX 6026, PHOTOMER 6210, PHOTOMER 6008, PHOTOMER 6010, PHOTOMER 6019, PHOTOMER 6363, PHOTOMER 6572, PHOTOMER 6891, PHOTOMER 6892 and PHOTOMER 6893-20R from Cognis Corporation and PE230 Block Resin from the Liofol Division of Henkel Corporation. The Sartomer Company also sells a wide variety of urethane(meth)acrylate oligomers, including, for example, CN961, CN962, CN963, CN964, CN965, CN966, CN980, CN981, CN9001, CN9002, CN9004, CN929, CN968, CN9788, CN983 CN984, CN9893, CN996, CN1963, CN972, CN975, CN978, CN9782, CN9783, CN991, CN992, CN994, CN997, and CN999. Other suppliers of suitable urethane (meth)acrylate oligomers include Rahn Inc. (under the brand name GENOMER) and UCB Chemicals (under the brand name EBECRYL). Certain suppliers sell admixtures of urethane (meth)acrylate oligomers and other components that can also be suitable for use in the present invention, provided the other components are also desirable for incorporation into the radiation-curable laminating adhesive or, at a minimum, do not interfere with the intended use and function of the adhesive. Examples of such admixtures include CN3100 and CN966H90 from Sartomer.

Materials capable of being utilized as the urethane(meth) acrylate oligomer component of the present invention are also described in published United States application US 2004/0127594, incorporated herein by reference in its entirety. See, in particular, structures (I) and (II) of the aforementioned published application.

Typically, the radiation-curable laminating adhesive of the present invention will contain from about 5 to about 70 weight % of one or more urethane(meth)acrylate oligomers.

The radiation-curable laminating adhesives of the invention additionally contain at least one carboxylic acid-functionalized (meth)acrylate monomer and/or at least one polybutadiene di(meth)acrylate.

Suitable carboxylic acid-functionalized ester-containing (meth)acrylate monomers include compounds containing at least one carboxylic acid group ($-CO_2H$), at least one (meth)acrylate group, and at least one ester linkage (in addition to the ester linkage(s) present in the (meth)acrylate group(s)) per molecule.

Such substances are well-known in the art and may be prepared using any suitable synthetic method. For example, one such method involves reacting a compound containing both a hydroxyl group and a (meth)acrylate group with an anhydride.

Suitable anhydrides include, but are not limited to anhydrides of aromatic and aliphatic polycarboxylic acids such as: phthalic anhydride; isophthalic anhydride; terephthalic anhydride; trimellitic anhydride; tetrahydrophthalic anhydride; hexahydrophthalic anhyride; tetrachlorophthalic anhydride; adipic anhydride; azelaic anhydride; sebacic anhydride; succinic anhydride; glutaric anhydride; malonic anhydride; pimelic anhydride; suberic anhydride; 2,2-dimethylsuccinic anhydride; 3,3-dimethylglutaric anhydride; 2,2-dimethylglutaric anhydride; dodecenylsuccinic anhydride; nadic methyl anhydride; HET anhydride; and the like. Alkyl-, alkenyl- and alkynyl-substituted cyclic anhydrides such as substituted succinic anhydrides, substituted glutaric anhydride, and the like may also be utilized. The alkyl, alkenyl or alkenyl substituent may, for example, contain from 1 to 18 carbon atoms and may be straight chain, cyclic or branched.

The compound containing a hydroxyl group and a (meth) acrylate group may, for example, be selected from the following: 2-hydroxyethyl (meth)acrylate; 2-hydroxypropyl (meth)acrylate; 2-hydroxybutyl (meth)acrylate; 2-hydroxy 3-phenyloxypropyl (meth)acrylate; 1,4-butanediol mono (meth)acrylate; 4-hydroxycyclohexyl (meth)acrylate; 1,6-hexanediol mono(meth)acrylate; neopentylglycol mono (meth)acrylate; trimethylolpropane di(meth)acrylate; rimethylolethane di(meth)acrylate; pentaerythritol tri(meth) acrylate; dipentaerythritol penta(meth)acrylate; and other hydroxy functional (meth)acrylates such as the hydroxy terminated (meth)acrylate monomers based on caprolactone sold under the brand name TONE by Dow Chemical (e.g. TONE M-100, M-101, and M-201).

Carboxylic acid-functionalized ester-containing (meth) acrylate monomers suitable for use in the present invention are available from commercial sources, including, for example, ECX 4046 from Cognis Corporation and the series of specialty oligomers sold by the Sartomer Company under the brand name SARBOX.

While the radiation-curable laminating adhesive need not contain any carboxylic acid-functionalized ester-containing (meth)acrylate monomer, in certain embodiments of the invention from about 40 to about 80 weight % or from about 50 to about 70 weight % of one or more such monomers are present.

The polybutadiene poly(meth)acrylate which may be present in the radiation-curable laminating adhesive may be any polybutadiene that has been modified or derivatized so as to attach two or more acrylate and/or methacrylate functional groups onto the polybutadiene polymer chain. The (meth)acrylate functional groups may, for example, be on the terminal positions of the polybutadiene and/or may be attached along the linear backbone of the polybutadiene. Typically, the polybutadiene poly(meth)acrylate will have a number average molecular weight within the range of from about 1000 to about 6000.

Suitable polybutadiene poly(meth)acrylates may be synthesized using any of the methods known in the art. For example, a process comprising a transesterification reaction between a hydroxyl terminated alkoxylated polybutadiene resin and a low molecular weight (meth)acrylate ester may be used, as described, for example, in WO 2005/023887. Polybutadiene poly(meth)acrylates containing free hydroxyl groups may be obtained by reacting a hydroxy terminated polybutadiene with an anhydride to form a carboxyl terminated polybutadiene derivative and then reacting the derivative with an epoxide such as glycidyl methacrylate, as described, for example, in U.S. Pat. No. 5,587,433. Alternatively, the polybutadiene poy(meth)acrylate may be prepared by reacting a hydroxyl terminated polybutadiene with (meth)acrylic acid or a reactive derivative thereof such as a lower alkyl ester or acid halide. Still another approach would be to react a hydroxyl terminated polybutadiene with an excess of a diisocyanate to form an NCO-terminated prepolymer and then reacting the prepolymer with a hydroxy-functionalized (meth)acrylate such as hydroxypropyl acrylate.

While it is not necessary for the laminating adhesive to contain any polybutadiene poly(meth)acrylate, in certain embodiments of the invention the adhesive will contain from about 1 to about 25 weight % or about 3 to about 18 weight % of one or more polybutadiene poly(meth)acrylates.

The laminating adhesives of the present invention may be formulated using one or more polybutadiene poly(meth) acrylates from commercial sources, such as, for example, CN301 and CN303 polybutadiene dimethacrylates from the Sartomer Company, CN302 and CN307 polybutadiene diacrylate from the Sartomer Company, or RICACRYL 3500, RICACRYL 3801 or RICACRYL 3100 from the Sartomer Company.

In addition to the aforedescribed carboxylic acid functional ester-containing (meth)acrylates and/or polybutadiene poly(meth)acrylates, the radiation curable laminating adhesive of the present invention may also contain one or more additional compounds which contain at least one functional group polymerizable by exposure to radiation such as UV light or electron beam radiation. Preferably, the polymerizable functional group is an olefinically unsaturated double bond.

For example, one or more reactive diluents may optionally be present in the radiation-curable laminating adhesive to lower the viscosity of the formulation to facilitate application to a substrate at the desired application temperature. Preferably, the adhesive is formulated so as to provide a viscosity within the range of from about 1500 to 8000 cps at 25 degrees C. Reactive diluents include a wide variety of free-radically polymerizable monomers such as: mono-acrylates and methacrylates such as methyl acrylate, methyl methacrylate, ethyl acrylate, isopropyl methacrylate, isooctyl acrylate, isobornyl acrylate, isobornyl methacrylate, acrylic acid, n-hexyl acrylate, stearyl acrylate, allyl acrylate, tetrahydrofurfuryl(meth) acrylate, 2(2-ethoxyethoxy)ethyl acrylate, 2-phenoxyethyl acrylate, ethoxylated nonyl phenol acrylate, acrylated monomers such as those described in U.S. Pat. No. 4,652,274, monomethoxy tripropylene glycol monoacrylate (available from Cognis Corporation under the designation PHOTOMER 8061), neopentylglycol propoxylate (2) methylether monoacrylate (available from Cognis Corporation under the designation PHOTOMER 8127).

Although the radiation-curable laminating adhesive need not contain any reactive diluent, typically from about 1 to about 20 weight % of one or more reactive diluents will be present.

Radiation-curable oligomers and polymers other than the aforementioned urethane (meth)acrylate oligomers and polybutadiene poly(meth)acrylates may also be present in the radiation-curable laminating adhesive such as, for example, (meth)acrylate oligomers other than urethane (meth)acrylate oligomers (including, for example, (meth) acrylic polyol (meth)acrylates, chlorinated polyester (meth) acrylate oligomers, epoxy (meth)acrylate oligomers, polyester (meth)acrylate oligomers, polyamide (meth)acrylate oligomers, polyether (meth)acrylate oligomers and the like.

For example, (meth)acrylic polyol (meth)acrylates may be utilized which are prepared from poly(meth)acrylates which carry OH groups. These poly(meth)acrylates are obtainable, for example, through the polymerization of ethylenically unsaturated monomers which carry an OH group. Monomers of this kind are obtainable, for example, through the esterification of ethylenically unsaturated carboxylic acids and difunctional alcohols, the alcohol generally being present in a slight excess. Ethylenically unsaturated carboxylic acids suitable for this purpose are, for example, acrylic acid, methacrylic acid, crotonic acid, or maleic acid. Corresponding esters which carry OH groups are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate, or mixture of two or more thereof. The poly (meth)acrylates may be additionally comprised of ethylenically unsaturated monomers which do not carry an OH group, such as, for example, (meth)acrylate esters and the like. At least a portion of the OH groups on the poly(meth) acrylates are then esterified with ethylenically unsaturated carboxylic acids such as (meth)acrylic acid to provide the (meth)acrylic polyol (meth)acrylates.

Additionally, the hydroxy functionality may be incorporated into the (meth)acrylic polyol in the form of a hydroxy functional vinyl ether such as hydroxy butyl vinyl ether, hydroxy functional styrenic compounds, etc. Hydroxyl functionality may also be incorporated by using allylic alcohols and similar allylic monomers such as alkoxylated allylic alcohols. Methods of incorporating these hydroxy functional allyl monomers into acrylic polyols is disclosed in U.S. Pat. Nos. 5,475,073, 5,534,598, 5,919,874, 6,127,500, 6,762, 262, 6,103,840, 6,362,297, 5,382,642, 5,451,652, 5,480,954, 6,153,713 and 6,906,136, each of which is incorporated herein by reference in its entirety. Acrylic polyols based on hydroxy-functional allylic monomers are also available from commercial sources such as Lyondell Chemical Company (under the brand name ACRYFLOW). Such acrylic polyols may, for example, have number average molecular weights of from about 2000 to about 4000, weight average molecular weights from about 4000 to about 10,000, and average functionalities of from about 2 to about 8 hydroxy groups per molecule.

The (meth)acrylic polyol may comprise recurring units of an allylic alcohol and/or alkoxylated allylic alcohol, an acrylate or methacrylate monomer, and optionally, an ethylenic monomer. Useful allylic alcohols include compounds have the general structure $CH_2=CR-CH_2-OH$ in which R is selected from the group consisting of hydrogen and $C_1$-$C_5$ alkyl (methyl, ethyl, n-propyl, isopropyl, etc.). Suitable allylic alcohols include, but are not limited to, allyl alcohol, methallyl alcohol, 2-ethyl-2-propen-1-ol, and the like, and mixtures thereof. A alkoxylated allylic alcohol can be used instead of or in addition to the allylic alcohol. Preferred alkoxylated allylic alcohols have the general structure $CH_2=CR'-CH_2-(A)_n-OH$ in which A is an oxypropylene group, R' is selected from the group consisting of hydrogen and $C_1$-$C_5$ alkyl, and n, which is the average number of oxypropylene groups in the alkoxylated allylic alcohol, has a value less than or equal to 2. The oxypropylene groups in the propoxylated allylic alcohols have one or both of the structures —OCH(CH$_3$)—CH$_2$—and —O—CH$_2$—CH(CH$_3$)—.

The amount of allylic alcohol and/or alkoxylated allylic alcohol used to prepare the (meth)acrylic polyol depends many factors, but most important among these is the desired hydroxyl group content of the (meth)acrylic polyol. Generally, it is preferred to incorporate into the (meth)acrylic polyol an amount of allylic alcohol and/or alkoxylated allylic alcohol within the range of about 5 to about 60 wt. % or, alternatively, from about 10 to about 50 wt. %.

The (meth)acrylic polyol may also include one or more (meth)acrylate monomers. Suitable monomers include C$_1$-C$_{20}$ alkyl or aryl (meth)acrylates. Especially preferred are C$_1$-C$_{10}$ alkyl (meth)acrylates. Examples include, but are not limited to, methyl acrylate, methyl methacrylate, ethyl acrylate, butyl acrylate, butyl methacrylate, and the like, and mixtures thereof. It is often advantageous to use mixtures of various (meth)acrylates to control the resin glass-transition temperature of the (meth)acrylic polyol and the (meth)acrylic polyol acrylate prepared therefrom. The (meth)acrylate monomer is commonly the major component in the (meth)acrylic polyol. For example, the (meth)acrylate may comprise from about 40 to about 95 wt. % (alternatively, from about 50 to about 90 wt. %)of recurring units derived from the (meth)acrylate monomer(s).

An ethylenic monomer may optionally be used as an additional type of monomer in the preparation of the (meth)acrylic polyol. Exemplary ethylenic monomers include vinyl aromatic monomers, unsaturated nitriles, vinyl esters, vinyl ethers, vinyl halides, vinylidene halides, unsaturated anhydrides, unsaturated dicarboxylic acids, acrylic and methacrylic acids, acrylamide and methacrylamide, conjugated dienes, and mixtures thereof. Suitable ethylenic monomers include, for example, styrene, acrylonitrile, vinyl acetate, methyl vinyl ether, vinyl chloride, vinylidene chloride, maleic anhydride, maleic acid, fumaric acid, and the like. The (meth)acrylic polyol may include from about 0.1 to about 50 wt. % (alternatively, from about 5 to about 10 wt. %) of recurring units derived from the optional ethylenic monomer.

The (meth)acrylic polyol may have a hydroxyl number within the range of about 20 to about 500 mg KOH/g or, alternatively, from about 100 to about 250 mg KOH/g. The (meth)acrylic polyol may have a glass transition temperature (Tg) within the range of about −50 degrees C. to about 150 degrees C. or alternatively from about −20 degrees C. to about 100 degrees C.

In one embodiment of the invention, the (meth)acrylic polyol used to prepare the (meth)acrylic polyol (meth)acrylate has a relatively high molecular weight (e.g., a number average molecular weight of at least about 2000 and/or a weight average molecular weight of at least about 4000). In another embodiment of the invention, the (meth)acrylic polyol (meth)acrylate contains an average of from about 2 to about 8 (meth)acrylate functional groups per molecule.

In one embodiment of the invention, the radiation-curable laminating adhesive contains from about 1 to about 30 weight % of one or more (meth)acrylic polyol (meth)acrylates. In another embodiment, the adhesive is comprised of from about 5 to about 25 weight % of (meth)acrylic polyol (meth)acrylate(s).

In one embodiment of the invention, a radiation-curable laminating adhesive is provided which is comprised of at least one (meth)acrylic polyol (meth)acrylate containing recurring units of at least one monomer selected from the group consisting of allylic alcohols and alkoxylated allylic alcohols and at least one one additional (meth)acrylate-functionalized monomer or oligomer.

Any of the adhesion promoters known in the radiation-curable adhesive art may optionally be present in the adhesives of the present invention, with phosphorus derivatives containing one or more olefin groups per molecule being a preferred type of adhesion promoter. Phosphorus derivatives which are effective adhesion promoters are described, for example, in U.S. Pat. No. 6,559,257, incorporated herein by reference in its entirety. The phosphorus-containing adhesion promoter sold under the designation CD 9052 by the Sartomer Company may also be utilized. The adhesion promoter(s) may be present, for example, in concentrations of up to about 20 weight percent (e.g., about 2 to about 18 weight percent).

When the radiation-curable adhesive is intended to be cured by exposure to visible light, ultraviolet light, or the like, one or more photoinitiators and/or photosensitizers can be used as polymerization initiators to enhance the cure speed. If desired, such photoinitiators and/or photosensitizers can be incorporated in the radiation-curable laminating adhesive in an amount of about 0.1 to about 5% by weight of the total composition. While the choice of photoinitiator is not believed to be critical, in one embodiment of the invention a benzoyl phosphine oxide photoinitiator such as 2,4,6-trimethylbenzoyldiphenylphosphine oxide is employed. Suitable commercially-available photoinitiators include IRGACURE 819, DAROCUR 1 173 and SR 1129. In another embodiment of the invention, one or more polymeric photoinitiators are utilized in the radiation-curable laminating adhesive. The use of polymeric photoinitiators further reduces the possibility of the photoinitiator or fragments of the photoinitiator migrating through the layers of the flexible laminates produced using the adhesive.

Other additives may additionally be incorporated into the radiation-curable laminating adhesive for the purpose of modifying one or more properties or characteristics of the adhesive. Such additional additives may include, for example, tackifiers (tackifying resins), plasticizers, stabilizers, anti-oxidants, dyes, fillers, thermoplastic polymers, rheology modifiers, and the like.

Preferably, the radiation-curable laminating adhesive is essentially free of water as well as non-reactive organic solvents (i.e., solvents not capable of reacting with the other components of the adhesive when the adhesive is irradiated).

Especially preferred embodiments of the radiation-curable laminating adhesive of the present invention are as follows:

Embodiment A
Aliphatic Urethane Acrylate Oligomer
Polybutadiene Diacrylate (about 5 to about 20 weight %)
Reactive Diluent(s)
Acrylic Oligomer Photoinitiator (optional, if adhesive is to be EB cured)
Tackifier (optional)
Embodiment B
Aliphatic Urethane Acrylate Oligomer
Polybutadiene Diacrylate (about 10 to about 20 weight %)
Reactive Diluent(s)
Acrylic Oligomer
Photoinitiator (optional, if adhesive is to be EB cured)
Phosphorus-Containing Adhesion Promoter (about 10 to about 20 weight
Embodiment C
Acrylic Oligomer
Urethane Acrylate Oligomer
Photoinitiator (optional, if adhesive is to be EB cured)
Reactive Diluent(s)
Phosphorus-Containing Adhesion Promoter (about 2 to about 10 weight
Chlorinated Polyester Acrylate Oligomer (about 1 to about 10 weight %)
Embodiment D
Acrylic Oligomer
Urethane Acrylate Oligomer
Carboxylic Acid-Functionalized Ester-Containing (Meth) Acrylate (preferably about 50 to about 70 weight %)
2(2-Ethoxyethoxy)ethyl acrylate (preferably about 1 to about 10 weight
Additional Reactive Diluent(s)
Photoinitiator (optional, if adhesive is to be EB cured)
Embodiment E
Acrylic Oligomer
Aliphatic Urethane Acrylate Oligomer
Photoinitiator (optional, if adhesive is to be EB cured)
Carboxylic Acid-Functionalized Ester-Containing (Meth) Acrylate (preferably about 50 to about 70 weight %)
2(2-Ethoxyethoxy)ethyl acrylate (preferably, about 1 to about 10 weight
Additional Reactive Diluent(s)
Acrylic Polyol Acrylate (preferably, about 5 to about 30 weight %)

The film or films to be coated or adhered to each other using the radiation-curable laminating adhesives of the present invention may be comprised of any of the materials known in the art to be suitable for use in flexible packaging, including both polymeric and metallic materials as well as paper (including treated or coated paper). Thermoplastics are particularly preferred for use as at least one of the layers. The materials chosen for individual layers in a laminate are selected to achieve specific desired combinations of properties, e.g., mechanical strength, tear resistance, elongation, puncture resistance, flexibility/stiffness, gas and water vapor permeability, oil and grease permeability, heat sealability, adhesiveness, optical properties (e.g., clear, translucent, opaque), formability, merchantability and relative cost. Individual layers may be pure polymers or blends of different polymers. The polymeric layers are often formulated with colorants, anti-slip, anti-block, and anti-static processing aids, plasticizers, lubricants, fillers, stabilizers and the like to enhance certain layer characteristics.

Particularly preferred polymers for use in the present invention include, but not limited to, polyethylene (including low density polyethylene (LDPE), medium density polyethylene (MDPE), high density polyethylene (HPDE), high molecular weight, high density polyethylene (HMW-HDPE), linear low density polyethylene (LLDPE), linear medium density polyethylene (LMPE)), polypropylene (PP), oriented polypropylene, polyesters such as poly (ethylene terephthalate) (PET) and poly (butylene terephthalate) (PBT), ethylene-vinyl acetate copolymers (EVA), ethylene-acrylic acid copolymers (EAA), ethylene-methyl methacrylate copolymers (EMA), ethylene-methacrylic acid salts (ionomers), hydrolyzed ethylene-vinyl acetate copolymers (EVOH), polyamides (nylon), polyvinyl chloride (PVC), poly(vinylidene chloride) copolymers (PVDC), polybutylene, ethylene-propylene copolymers, polycarbonates (PC), polystyrene (PS), styrene copolymers, high impact polystyrene (HIPS), acrylonitrile-butadiene-styrene polymers (ABS), and acrylonitrile copolymers (AN).

The polymer surface may be treated or coated, if so desired. For example, a film of polymer may be metallized by depositing a thin metal vapor such as aluminum onto the film's surface. Metallization may enhance the barrier properties of the finished laminate. The polymer film surface may also be coated with anti-fog additive or the like or subjected to a pretreatment with electrical or corona discharges, or ozone or other chemical agents to increase its adhesive receptivity. Coextruded and/or printed (e.g., with text or graphics) polymer films may also be employed.

One or more layers of the laminate may also comprise a metal foil, such as aluminum foil, or the like. The metal foil will preferably have a thickness of about 5 to 100 μm.

The individual films comprising the laminates of the present invention can be prepared in widely varying thicknesses, for example, from about 5 to about 200 microns. The films, foils, and laminating adhesive formulation can be assembled into the laminate by using any one or more of the several conventional procedures known in the art for such purpose. For instance, the adhesive formulation may be applied to the surface of one or both of two films/foils by means of extrusion, brushes, rollers, blades, spraying or the like and the film/foil surfaces bearing the adhesive composition brought together and passed through a set of rollers (often referred to as nip rollers) which press together the film/foils having the adhesive composition between the films/foils. Typically, the application temperature for the radiation-curable laminating adhesive is from about 20 to about 50 degrees C. If desired, the aforedescribed coating and lamination steps may be repeated with additional flexible layers to provide a laminate containing more than two flexible layers. The resulting laminate may be rolled or wound onto a reel. The radiation-curable laminating adhesive may be applied by conventional techniques; e.g., by a multi-roll application station.

Typically, the rate at which the adhesive formulation is applied to the surface of a film or foil is in the range of about 1 to about 2.5 pounds per 3000 square feet of the substrate (about 1.6 to about 4.0 g/m$^2$).

The radiation-curable laminating adhesive of the present invention can be cured using conventional techniques for radiation curing, such as irradiation of the adhesive directly through the layers of the laminate using UV (ultraviolet) light from low, medium and/or high pressure mercury lamps, He—Cd and Ar lasers, Xenon arc lamps, low intensity fluorescent lamps or other suitable source. The UV light may have a wavelength of from about 200 to about 450 nanometers. Irradiation of the adhesive initiates polymerization and/or crosslinking of the reactive components of the adhesive (e.g., the components containing one or more (meth) acrylate functional groups per molecule). When using UV light to cure the adhesive, the laminate should be constructed of one or more polymer layers which are selected and arranged such that the UV light is able to penetrate the laminate from at least one side in order to reach the adhesive layer(s). That is, the laminate layers should be selected so that the UV light is not absorbed, shielded or reflected so as to prevent or substantially inhibit interaction of the UV light with the adhesive layer. Thus, it is preferred that the laminate layer(s) which is (are) between the adhesive layer and the source of UV light be substantially transparent to UV radiation. When using UV light to cure the radiation-curable laminating adhesive, it will usually be desirable to include one or more photoinitiators in the adhesive. Alternatively, electron beam (EB) radiation may be used to cure the radiation-curable laminating adhesive. In this embodiment, the laminate layer(s) between the source of electron beams and the adhesive layer in the laminate should be capable of being penetrated by electron beam radiation. The degree of penetration of the electrons into the flexible packaging laminate may be varied as desired by adjusting the acceleration potential of the beam. Generally, a range of potentials from about 60 to 250 KV is suitable, with a range of about 70 to 170 KV being preferred. The total amount of electron beam energy (i.e., the dose of energy) applied to the laminate may be measured in units of Mrads. A range of dosages from about 0.5 to 6.0 Mrads will typically be appropriate for curing the adhesive of the present invention, with a dosage range of about 1 to about 5 Mrads being preferred.

Preferably, all layers of adhesive used to assemble the flexible packaging laminate are radiation-curable adhesives in accordance with the present invention. However, one of the adhesives may be non-radiation-curable if desired or may be a radiation-curable adhesive of a type not corresponding to the present invention. In laminates containing a plurality of adhesive layers, at least one adhesive layer must comprise a radiation-curable laminating adhesive according to the present invention. Although any radiation-curable adhesive must be applied to the substrates before being irradiated, non-radiation-curable adhesives may be applied before or after the laminate is exposed to radiation.

Laminates prepared in accordance with the present invention may be used for packaging purposes in the same manner as conventional or known flexible laminated packaging films. The laminates are particularly suitable for forming into flexible pouch-shaped container vessels capable of being filed with a foodstuff and retorted. For example, two rectangular or square sheets of the laminate may be piled in the desired configuration or arrangement; preferably, the two layers of the two sheets which face each other are capable of being heat-sealed to each other. Three peripheral portions of the piled assembly are then heat-sealed to form the pouch. Heat-sealing can easily be accomplished by means of a heating bar, heating knife, heating wire, impulse sealer, ultrasonic sealer, or induction heating sealer.

The foodstuff is thereafter packed in the so-formed pouch. If necessary, gasses injurious to the foodstuff such as air are removed by known means such as vacuum degasification, hot packing, boiling degasification, or steam jetting or vessel deformation. The pouch opening is then sealed using heat. The packed pouch may be charged to a retorting apparatus and sterilized by heating to a temperature greater than about 100C.

EXAMPLES

Radiation-curable laminating adhesives were prepared having the compositions shown in Table 1. The amounts listed for each component are in weight percent.

TABLE 1

| Component | Supplier | Composition | Ex. 1(A/B) | Ex. 2 | Ex. 3 | Ex. 4 | Ex. 5 | Ex. 6 | Ex. 7 | Ex. 8 |
|---|---|---|---|---|---|---|---|---|---|---|
| CN 3100 | Sartomer | Mixture of aliphatic urethane acrylate + low viscosity acrylic oligomer + methacrylate acid ester + acrylic ester | 79.5/84.5 | 79 | 60 | 14 | 14 | 14 | 14 | 15 |
| NTX 6039/CN 307 | Sartomer | Polybutadiene Diacrylate | 10/15 | 15 | 5 | | | | 10 | |
| CN 3002 | Sartomer | Mixture of acrylic monomer + hydrocarbon tackifier | 10/0 | | | | | | | |
| IRGACURE 819 | Ciba | Benzoyl phosphineoxide photoinitiator | 0.5/0.5 | 1 | 1 | 1 | 1 | 1 | 1 | |
| CD 9052 | Sartomer | Trifunctional phosphate ester adhesion promoter | | 15 | 6 | | | | | |
| PHOTOMER 4173 | Cognis | Acrylate oligomer | | | 13 | | | | | |
| CN966H90 | Sartomer | Mixture of urethane acrylate & 2(2-ethoxyethoxy)ethyl acrylate | | | 10 | | | | | |
| CN 738 | Sartomer | Chlorinated polyester acrylate oligomer | | | | 5 | | | | |
| SR 256 | Sartomer | 2(2-ethoxyethoxy)ethyl acrylate | | | | | 5 | 5 | 5 | 5 | 5 |
| ECX 6026 | Cognis | Urethane acrylate | | | | 20 | | 10 | | |
| ECX 4046 | Cognis | Carboxylic Acid-Functionalized Monoacrylate | | | | 60 | 60 | 60 | 60 | 60 |
| High MW Acrylic Polyol Acrylate | Liofol | High MW Acrylic Polyol Acrylate | | | | | 20 | 10 | | 10 |
| PE230 Block Resin | Liofol | Polyester-urethane acrylate oligomer | | | | | | 10 | | 10 |

Examples 1A and 1B had the objective of developing radiation-curable laminating adhesives having strong bonds and moisture-resistant properties in a two layer laminate structure, especially film to foil. In Examples 1A and 1B, the adhesive compositions were each separately applied to 0.5 foil substrates and a second layer of 48 gauge PET film (or printed PET film) was placed over the adhesive-coated foil substrate. The adhesive was then cured by UV radiation through the PET film with a 300 w/in medium pressure mercury arc lamp, using a D bulb (100% power) at 100 ft/minute conveyor speed. The bond strength of each laminate was determined by a T-peel test in a T-peel configuration at 12 inches per minute on 1 inch wide strips.

The results obtained are shown in Table 2:

TABLE 2

| Adhesive Example No. | Laminate Structure | Bond Strength (lb) | Bond Strength (after 2 hr. water soak) |
|---|---|---|---|
| 1A | PET/Foil | 0.85 (stock tear) | 0.40 (peel) |
| 1A | Printed PET/Foil | 0.87 (stock tear) | 0.96 (peel) |
| 1B | PET/Foil | 0.97 (stock split) | 0.92 (peel) |
| 1B | Printed PET/Foil | 0.64 (stock split) | 0.22 (peel) |

The adhesive of Example 2 was developed with the objective of providing a radiation-curable laminating adhesive for a three layer flexible laminate structure (preferably PET/Foil/PE) with high bond strength, good moisture-resistant properties, and strong heat seal bonds at room temperature (RT), 70 degrees C and 85 degrees C. Example 2 differs from Example 1B primarily in the addition of CD 9052 adhesion promoter (Sartomer Company).

The adhesive of Example 2 was applied to a 4 mil LLDPE film and a second layer of 0.5 mil foil was placed over the wet adhesive coating. The adhesive was cured by UV exposure with a 300 w/in medium pressure mercury lamp using H bulb (79% power) at 200 ft/minute conveyor speed. The adhesive was then applied on the foil side of the Foil/PE laminate and the third layer (48 gauge PET film) was placed over the wet adhesive coating. The adhesive was then cured by UV exposure through the PET film. The bond strengths of the resulting laminates were determined by a T-peel test in a T-peel configuration at 2 inches per minute on 15 mm strips.

The results obtained are shown in Table 3.

TABLE 3

| Adhesive Example No. | Laminate Structure | Bond Strength (lb) | Heat Seal, RT (lb) | Heat Seal, 70° C. (lb) | Heat Seal, 85° C. |
|---|---|---|---|---|---|
| 2 | PET/Foil | 0.95 (stock tear) | | | |
| 2 | PE/Foil | 1.07 (stock tear) | | | |
| 2 | PET/Foil/PE | | 5.97 (stock tear) | 1.51 (bridge) | 1.51 (bridge) |

Example 3 had the objective of developing a radiation-curable laminating adhesive having improved bond strengths as compared to the adhesive of Example 2, especially with respect to the heat seals at RT, 70° C., and 85° C. The adhesive of Example 3 was applied to a prelaminated Foil/PE structure and a third layer (48 gauge printed PET) was placed over the wet adhesive. The adhesive was cured by UV radiation with a 300 w/in medium pressure mercury arc lamp, using a D bulb (100% power) at 100 ft/minute conveyor speed. The bond strengths of the resulting flexible laminates were determined by a T-peel test in a T-peel configuration at 2 inches per minute on 1 inch wide strips.

The results obtained are shown in Table 4.

TABLE 4

| Adhesive Example No. | Laminate Structure | Bond Strength, RT (lb) | Watersoak Bond Strength (lb) | Heat Seal, RT (lb) | Heat Seal, 70° C. (lb) | Heat Seal, 85° C. (lb) |
|---|---|---|---|---|---|---|
| 3 | PET/Foil | 1.26 (stock tear) | 0.46 (peel) | | | |
| 3 | PET/prelam Foil/PE | | | 12.45 (stock tear) | 4.61 (bridge/ stock tear) | 4.6 (bridge/ stock tear) |

The radiation-curable laminating adhesive of Example 4 was used to prepare PET/Foil and PET/prelaminated Foil/PE laminates, following the same procedures described hereinabove with respect to the adhesive of Example 3.

The results obtained are shown in Table 5.

TABLE 5

| Adhesive Example No. | Laminate Structure | Bond Strength, RT (lb) | WaterSoak Bond Strength (lb) | Heat Seal, RT (lb) | Heat Seal, 70° C. (lb) | Heat Seal, 85° C. (lb) |
|---|---|---|---|---|---|---|
| 4 | PET/Foil | 2.32 (stock tear) | 2.69 (stock tear) | | | |
| 4 | PET/prelam Foil/PE | | | 15.98 (stock tear) | 5.87 (bridge/ stock tear) | 4.96 (bridge/ stock tear) |

As compared to the adhesive of Example 3, the adhesive of Example 4 exhibited improvement, especially in moisture resistance properties. However, the heat seal bonds did not greatly improve.

The objective of Example 5 was to develop a radiation-curable laminating adhesive which provides improved heat seal bonds as compared to the adhesive of Example 4.

The adhesive of Example 5 was applied to a prelaminated Foil/PE structure and a third layer (48 gauge PET film) was then placed over the coating of wet adhesive. The adhesive was cured by UV radiation with a 300 w/in medium pressure mercury arc lamp, using a D bulb (100% power) at 100 ft/minute conveyor speed. The bond values were determined by a T-peel test, in a T-peel configuration at 2 inches per minute on 1 inch wide strips.

The results obtained are shown in Table 6:

TABLE 6

| Adhesive Example No. | Laminate Structure | Bond Strength, RT (lb) | Watersoak Bond Strength (lb) | Heat Seal, RT (lb) | Heat Seal, 70° C. (lb) | Heat Seal, 85° C. |
|---|---|---|---|---|---|---|
| 5 | PET/Foil | 1.58 (stock tear) | 4.03 (stock tear) | | | |
| 5 | PET/prelam Foil/PE | | | 12.82 (stock tear) | 6.53 (bridge/ stock tear) | 7.0 (bridge/ stock tear) |

An improvement in heat seal bond strength was realized, as compared to the adhesive of Example 4. This improvement was believed to be due to the incorporation of a high molecular weight acrylic polyol acrylate in the adhesive formulation. The acrylic polyol acrylate was prepared by esterifying an acrylic polyol based on hydroxy-functional allylic monomers (source: Lyondell Chemical Company) with acrylic acid.

The objective of Example 6 was to develop a radiation-curable laminating adhesive having enhanced room temperature heat seal bond strength as compared to the adhesive of Example 5.

The adhesive was applied to a prelaminated Foil/PE substrate and a third layer (48 gauge printed PET film) then placed over the coating of wet adhesive. The adhesive was cured by UV radiation with a 300 w/in medium pressure mercury arc lamp, using a D bulb (100% power) at 100 ft/minute conveyor speed. The bond strength was determined by a T-peel test, in a T-peel configuration at 2 inches per minute on 1 inch wide strips.

The results obtained are shown in Table 7.

TABLE 7

| Adhesive Example No. | Laminate Structure | Bond Strength, RT (lb) | Watersoak Bond Strength (lb) | Heat Seal, RT (lb) | Heat Seal, 70° C. (lb) | Heat Seal, 85° C. (lb) |
|---|---|---|---|---|---|---|
| 6 | PET/Foil | 1.15 (stock tear) | 1.99 (stock tear) | | | |
| 6 | PET/prelam Foil/PE | | | 17.48 (stock tear) | 5.50 (bridge/ stock tear) | 5.21 (bridge/ stock tear) |

The adhesive of Example 6 exhibited enhanced RT heat seal, good 70° C. and 85° C. heat seal bond strength, and good moisture resistance. The improvement in the RT heat seal bond strength as compared to the adhesive of Example 5 is believed to be due to the incorporation of a polyester urethane acrylate oligomer in the adhesive of Example 6.

The objective of Example 7 was to determine the effect of modifying the adhesive of Example 4 by incorporating a polybutadiene diacrylate.

PET/Foil and PET/prelaminated Foil/PE flexible laminates were prepared using the adhesive of Example 7 and the procedures described hereinabove for Example 6.

The results obtained are shown in Table 8.

TABLE 8

| Adhesive Example No. | Laminate Structure | Bond Strength, RT (lb) | Watersoak Bond Strength (lb) | Heat Seal, RT (lb) | Heat Seal, 70° C. (lb) | Heat Seal, 85° C. (lb) |
| --- | --- | --- | --- | --- | --- | --- |
| 7 | PET/Foil | 0.94 (stock peel) | 0.51 (stock peel) | | | |
| 7 | PET/prelam Foil/PE | | | 15.14 (stock tear) | 7.37 (bridge/ stock tear) | 3.90 (bridge/ stock tear) |

Example 8 is an example of an electron beam-curable laminating adhesive in accordance with the present invention.

The adhesive of Example 8 was applied to a prelaminated Foil/PE substrate and a third layer (48 gauge printed PET film) was placed over the coating of wet adhesive. The adhesive was then cured by EB radiation at a dose of 3.5 Mrads and 125 KV power. The application nip temperature was 40° C. and the coating weight of the adhesive was 1.5 to 2.5 lb/ream. A Nord pilot laminator was employed. The bond strength values were measured by a T-peel test, in a T-peel configuration at 2 inches per minute on 1 inch wide strips.

The results obtained are shown in Table 9.

TABLE 9

| Adhesive Example No. | Laminate Structure | Bond Strength, RT (lb) | Watersoak Bond Strength (lb) | Heat Seal, RT (lb) | Heat Seal, 70° C. (lb) | Heat Seal, 85° C. (lb) |
| --- | --- | --- | --- | --- | --- | --- |
| 8 | PET/Foil | 0.60 (stock tear) | 0.69 (stock tear) | | | |
| 8 | PET/prelam Foil/PE | | | 19.54 (stock tear) | 8.17 (stock tear) | 6.30 (stock tear) |

The adhesive of Example 8 exhibited high heat seal bond strength at RT, 70° C., and 85° C. as well as very good moisture resistance.

When the laminates prepared using the adhesive of Example 8 were aged for two months, insignificant loss of adhesion was observed.

What is claimed is:

1. A radiation-curable adhesive for laminating films together to form a flexible packaging laminate, wherein the adhesive is free of water and tackifier and is prepared from
   a) about 5% to about 70% by weight of adhesive of: a1) at least one aliphatic urethane acrylate oligomer and a2) a polyester-urethane acrylate oligomer different from the a1) at least one aliphatic urethane acrylate oligomer;
   b) about 50% to about 70% by weight of adhesive of at least one carboxylic acid-functionalized ester-containing (meth)acrylate monomer; and
   c) about 1% to about 25% by weight of adhesive of at least one (meth)acrylic polyol (meth)acrylate that is the reaction product of a (meth)acrylate monomer, an allylic alcohol, optionally an alkoxylated allylic alcohol and optionally an ethylenic monomer, the (meth)acrylic polyol (meth)acrylate having a Mw greater than 4000 and an average functionality of about 2 to about 8 hydroxy groups per molecule.

2. The adhesive of claim 1 additionally comprising at least one photoinitiator.

3. The adhesive of claim 1 additionally comprising at least one benzoyl phosphine oxide photoinitiator.

4. The adhesive of claim 1 including at least one polybutadiene di(meth)acrylate.

5. The adhesive of claim 1 comprising at least one polybutadiene di(meth)acrylate, and additionally at least one acrylic monomer other than a carboxylic acid-functionalized ester-containing (meth)acrylate monomer, and at least one photoinitiator.

6. The adhesive of claim 1 additionally comprising at least one phosphorus-containing adhesion promoter.

7. The adhesive of claim 1 additionally comprising at least one reactive diluent.

8. The adhesive of claim 1, wherein the carboxylic acid-functionalized ester-containing (meth)acrylate monomer contains at least one carboxylic acid group, at least one (meth)acrylate group, and at least one ester linkage in addition to the ester linkage(s) present in the (meth)acrylate group(s).

9. The adhesive of claim 1, wherein the carboxylic acid-functionalized ester-containing (meth)acrylate monomer is obtained by reacting a compound containing both a hydroxyl group and a (meth)acrylate group with an anhydride.

10. The adhesive of claim 1, wherein the carboxylic acid functionalized ester-containing (meth)acrylate monomer is obtained by reacting a compound containing both a hydroxyl group and a (meth)acrylate group selected from the group consisting of 2-hydroxyethyl (meth)acrylate, 2-hydroxypropyl (meth)acrylate, 2-hydroxybutyl (meth)acrylate, 2-hydroxy 3-phenyloxypropyl (meth)acrylate, 1,4-butanediol mono(meth)acrylate, 4-hydroxycyclohexyl (meth)acrylate, 1,6-hexanediol mono(meth)acrylate, neopentylglycol mono(meth)acrylate, trimethylolpropane di(meth)acrylate, trimethylolethane di(meth)acrylate, pentaerythritol tri(meth)acrylate, and dipentaerythritol penta(meth)acrylate with an anhydride selected from the group consisting of phthalic anhydride, isophthalic anhydride, terephthalic anhydride, trimellitic anhydride, tetrahydrophthalic anhydride, hexahydrophthalic anhydride, tetrachlorophthalic anhydride, adipic anhydride, azelaic anhydride, sebacic anhydride, succinic anhydride, glutaric anhydride, malonic anhydride, pimelic anhydride, suberic anhydride, 2,2-dimethylsuccinic anhydride, 3,3-dimethylglutaric anhydride, 2,2-dimethylglutaric anhydride, dodecenylsuccinic anhydride; nadic methyl anhydride; HET anhydride, alkyl-substituted cyclic anhydrides, alkenyl-substituted cyclic anhydrides and alkynyl-substituted cyclic anhydrides.

11. The adhesive of claim 1, wherein,
the allylic alcohol has the structure $CH_2=CR-CH_2-OH$,
R is selected from hydrogen and $C_1$-$C_5$ alkyl;
the alkoxylated allylic alcohol has the structure $CH_2=CR'-CH_2-(A)_n-OH$,
A is an oxypropylene group having one or both of the structures $-OCH(CH_3)-CH_2-$ and $-O-CH_2-CH(CH_3)-$,
R' is selected from hydrogen and $C_1$-$C_5$ alkyl,
n is the average number of oxypropylene groups in the alkoxylated allylic alcohol, and
the oxypropylene groups have one or both of the structures $-OCH(CH_3)-CH_2-$ and $-O-CH_2-CH(CH_3)-$.

12. The adhesive of claim 1, wherein the (meth)acrylic polyol (meth)acrylate is the reaction product of a (meth)acrylate monomer, an allylic alcohol and optionally an ethylenic monomer.

13. A flexible packaging laminate comprised of a first film adjacent a polymeric film and the radiation curable laminating adhesive of claim 1 in cured form disposed between and bonding the films.

14. A flexible packaging laminate comprised of at least one polymeric film, at least one metal foil and the radiation-curable laminating adhesive of claim 1 in cured form, wherein a layer of the radiation-curable laminating adhesive is located between at least one polymeric film and at least one metal foil and adheres said at least one polymeric film and said at least one metal foil to each other.

15. The flexible packaging laminate of claim 13 wherein the polymeric film is comprised of a thermoplastic selected from the group consisting of polyethylene terephthalate, polyethylene, polypropylene, and polyvinylidene chloride.

16. A method of making a flexible packaging laminate, said method comprising
a) applying a layer of a radiation-curable laminating adhesive in accordance with claim 1 to a surface of a first flexible film, b) joining said first flexible film to a second flexible film with the layer of the radiation-curable laminating adhesive interposed between the first flexible film and the second flexible film, and c) curing the adhesive by exposing said adhesive to at least one of ultraviolet light or electron beam radiation.

17. The method of claim 16 wherein one of said first flexible film or second flexible film is a polymeric film and one of said first flexible film or second flexible film is a metallic foil.

18. The method of claim 16 wherein said first flexible film and said second flexible film are both polymeric films, said polymeric films being different in composition from each other.

19. A flexible container for holding a foodstuff in an interior cavity, comprising:
a first flexible laminate comprising a first thermoplastic film bonded to a first film by cured reaction products of the adhesive of claim 1; and
a second flexible laminate comprising a second thermoplastic film bonded to a second film by cured reaction products of the adhesive of claim 1;
wherein the thermoplastic films are adjacent and heat sealed around at least part of their periphery to form the interior cavity therebetween.

20. The flexible container of claim 19 wherein at least one of the first film or the second film comprises a metal foil.

* * * * *

UNITED STATES PATENT AND TRADEMARK OFFICE
CERTIFICATE OF CORRECTION

| | | |
|---|---|---|
| PATENT NO. | : 9,623,631 B2 | |
| APPLICATION NO. | : 11/158366 | |
| DATED | : April 18, 2017 | |
| INVENTOR(S) | : Alexander P. Mgaya and Balasubramaniam Ramalingam | |

It is certified that error appears in the above-identified patent and that said Letters Patent is hereby corrected as shown below:

In the Specification

Column 3, Line 8: Change "M-20)." to -- M-201) --.

Column 8, Line 40: Change "DAROCUR 1 173" to -- DAROCUR 1173 --.

Column 9, Line 11: After "20 weight", insert -- %) --.

Column 9, Line 18: After "10 weight", insert -- %) --.

Column 9, Line 29: After "10 weight", insert -- %) --.

Column 9, Line 39: After "10 weight", insert -- %) --.

Column 12, Line 32: Change "100C" to -- 100°C --.

Signed and Sealed this
Twentieth Day of February, 2018

Andrei Iancu
*Director of the United States Patent and Trademark Office*